United States Patent
Walker et al.

(10) Patent No.: US 6,484,153 B1
(45) Date of Patent: *Nov. 19, 2002

(54) SYSTEM AND METHOD FOR MANAGING THIRD-PARTY INPUT TO A CONDITIONAL PURCHASE OFFER (CPO)

(75) Inventors: Jay S. Walker, Ridgefield, CT (US); Sanjay K. Jindal, Wilton, CT (US); Bruce Schneier, Minneapolis, MN (US); Toby Weir-Jones, Stamford, CT (US)

(73) Assignee: Priceline.com Incorporated, Norwalk, CT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/923,524

(22) Filed: Sep. 4, 1997

Related U.S. Application Data

(63) Continuation-in-part of application No. 08/889,319, filed on Jul. 8, 1997, now Pat. No. 6,085,169, which is a continuation-in-part of application No. 08/707,660, filed on Sep. 4, 1996, now Pat. No. 5,794,207.

(51) Int. Cl.⁷ ............................................. G06F 17/60
(52) U.S. Cl. ............................... 705/38; 705/1; 705/39; 705/80; 235/379; 235/380
(58) Field of Search .......................... 705/1, 26, 35–38, 705/50, 66, 75, 76, 78, 80; 235/380, 379

(56) References Cited

U.S. PATENT DOCUMENTS

| | | |
|---|---|---|
| 3,573,747 A | 4/1971 | Adams et al. |
| 3,581,072 A | 5/1971 | Nymeyer |
| 4,247,759 A | 1/1981 | Yuris et al. |
| 4,449,186 A | 5/1984 | Kelly et al. |

(List continued on next page.)

FOREIGN PATENT DOCUMENTS

| | | |
|---|---|---|
| EP | 512 702 A2 | 11/1992 |
| WO | 95/16971 | 6/1995 |
| WO | 96/13013 | 5/1996 |
| WO | 96/34356 | 10/1996 |
| WO | 97/16797 | 5/1997 |
| WO | 97/46961 | 12/1997 |
| WO | 98/10361 | 3/1998 |

OTHER PUBLICATIONS

Piece of the Rock boosts Bellevue software firm. By Les GApay. p. 1. Monday, Nov. 16, 1987.*

Fishkin, Ken, Foresight Exchange Tutorial: (http://www.id-eosphere.com/fx/docs/tutorial.html) Feb. 19, 1999 at pp. 1–5.

(List continued on next page.)

*Primary Examiner*—Kyle J. Choi
*Assistant Examiner*—M. Irshadullah
(74) *Attorney, Agent, or Firm*—Morgan & Finnegan LLP

(57) ABSTRACT

A central controller receives an offer signal including at least one condition signal. The offer signal defines an offer having at least one condition from a customer. The central controller also receives a payment identifier signal for specifying an account from which funds may be paid. An informational signal relevant to the offer is received from a third party. The central controller transmits the offer signal and the informational signal to at least one seller. In response, an acceptance signal is received from at least one of the sellers. The central controller selects one acceptance signal, if more than one is received, and the corresponding lender is identified. The borrower is thereby bound to the identified lender under the terms and conditions of the offer. Use of the payment identifier signal is initiated if it is determined that the borrower has failed to abide by terms of the offer.

46 Claims, 14 Drawing Sheets

U.S. PATENT DOCUMENTS

| | | | |
|---|---|---|---|
| 4,553,222 A | | 11/1985 | Kurland et al. |
| 4,677,552 A | | 6/1987 | Sibley, Jr. |
| 4,751,728 A | | 6/1988 | Treat |
| 4,789,928 A | | 12/1988 | Fujisaki |
| 4,799,156 A | | 1/1989 | Shavit et al. |
| 4,903,201 A | | 2/1990 | Wagner |
| 4,931,932 A | | 6/1990 | Dalnekoff et al. |
| 5,021,953 A | | 6/1991 | Webber et al. |
| 5,101,353 A | | 3/1992 | Lupien et al. |
| 5,121,945 A | * | 6/1992 | Thonson et al. ............... 283/58 |
| 5,136,501 A | | 8/1992 | Silverman et al. |
| 5,168,446 A | | 12/1992 | Wiseman |
| 5,191,523 A | | 3/1993 | Whitesage |
| 5,191,613 A | | 3/1993 | Graziano et al. |
| 5,224,034 A | | 6/1993 | Katz et al. |
| 5,231,571 A | * | 7/1993 | D'Agostino ................. 705/36 |
| 5,243,515 A | | 9/1993 | Lee |
| 5,253,165 A | | 10/1993 | Leiseca et al. |
| 5,262,941 A | | 11/1993 | Saladin et al. |
| 5,283,731 A | | 2/1994 | Lalonde et al. |
| 5,297,031 A | | 3/1994 | Gutterman et al. |
| 5,329,589 A | | 7/1994 | Fraser et al. |
| 5,331,546 A | | 7/1994 | Webber et al. |
| 5,361,199 A | | 11/1994 | Shoquist et al. |
| 5,375,055 A | | 12/1994 | Togher et al. |
| 5,404,291 A | | 4/1995 | Kerr et al. |
| 5,420,914 A | | 5/1995 | Blumhardt |
| 5,426,281 A | | 6/1995 | Abecassis |
| 5,444,630 A | | 8/1995 | Dlugos |
| 5,467,269 A | | 11/1995 | Flaten |
| 5,477,040 A | * | 12/1995 | Lalonde ...................... 235/380 |
| 5,500,793 A | | 3/1996 | Deming, Jr., et al. |
| 5,517,555 A | | 5/1996 | Amadon et al. |
| 5,519,769 A | | 5/1996 | Weinberger et al. |
| 5,553,131 A | | 9/1996 | Minervino, Jr. et al. |
| 5,557,517 A | | 9/1996 | Daughterty, III |
| 5,557,518 A | | 9/1996 | Rosen |
| 5,570,283 A | | 10/1996 | Shoolery et al. |
| 5,592,375 A | | 1/1997 | Salmon et al. |
| 5,604,341 A | * | 2/1997 | Grossi et al. ............... 235/379 |
| 5,606,602 A | | 2/1997 | Johnson et al. |
| 5,611,052 A | * | 3/1997 | Dykstra et al. ............... 705/38 |
| 5,615,269 A | | 3/1997 | Micali |
| 5,640,390 A | | 6/1997 | Sakamoto et al. |
| 5,664,115 A | | 9/1997 | Fraser |
| 5,689,652 A | | 11/1997 | Lupien et al. |
| 5,694,551 A | | 12/1997 | Doyle et al. |
| 5,696,965 A | | 12/1997 | Dedrick |
| 5,699,527 A | * | 12/1997 | Davidson ..................... 705/38 |
| 5,715,402 A | | 2/1998 | Popolo |
| 5,717,989 A | | 2/1998 | Tozzoli et al. |
| 5,727,249 A | * | 3/1998 | Pollin .......................... 705/40 |
| 5,732,400 A | | 3/1998 | Mandler et al. |
| 5,742,775 A | * | 4/1998 | King ........................... 705/38 |
| 5,745,882 A | | 4/1998 | Bixler et al. |
| 5,757,917 A | | 5/1998 | Rose et al. |
| 5,758,328 A | | 5/1998 | Giovannoli |
| 5,774,883 A | | 6/1998 | Andersen et al. |
| 5,794,207 A | * | 8/1998 | Walker et al. ................ 705/23 |
| 5,794,219 A | | 8/1998 | Brown |
| 5,797,127 A | | 8/1998 | Walker et al. |
| 5,799,285 A | | 8/1998 | Klingman |
| 5,809,478 A | | 9/1998 | Greco et al. |
| 5,822,737 A | | 10/1998 | Ogram |
| 5,826,244 A | | 10/1998 | Huberman |
| 5,832,452 A | | 11/1998 | Schneider et al. |
| 5,835,896 A | | 11/1998 | Fisher et al. |
| 5,845,265 A | | 12/1998 | Woolston |
| 5,870,721 A | * | 2/1999 | Norris ......................... 705/38 |
| 5,878,403 A | * | 3/1999 | DeFrancesco et al. ....... 705/38 |
| 5,893,080 A | * | 4/1999 | McGurl et al. ............... 705/40 |

OTHER PUBLICATIONS

"Bid.com 1998 Third–Quarter Revenue Increases 12.5 Percent From Second Quarter", Business Wire, Oct. 29, 1998.

Final Report: Virtual Hospital (http://www.telemed.medadmin.uiowa.edu/TRCDocs/Pubs/FinalReport/cVirtualH/virtualH/virtual h02.html), download date: Sep. 20,1998.

"First Source Become a Member", More Reasons To Join First Source! (http://www.fsource.com/bene.html), download date: Sep. 20, 1998.

Jeffrey Davis, "Big Storm rising", Business 2.0, Sep., 1998 at p. 60.

Suite 101.com (http://www.suite101.com/doc.cfm.presskit/questions), 1998.

Web Marketing Today (http://www.wilsonweb.com/rfwilson/wmt2/issue36htm) dated Sep. 1, 1997, download date: Sep. 17, 1998.

"Free Stuff Internet Site Delivers for Viewers and Advertisers Alike", Press Release of PromoNet Interactive, Inc. dated Nov. 10, 1997.

About Iao, selected pages downloaded from www.iaoauction.com on Sep. 8, 1997 and Sep. 18, 1997.

Onsale: Auction Supersite, selected pages downloaded from www.onsale.com on Sep. 8, 1997.

Hapgood, Fred "bidder Harvest", Sep. 1997, p. 58.

NASDAQ: What is NASDAQ?, selected pages downloaded from http://home.axford.com on Aug. 15, 1997.

NASDAQ Consolidated Subscriber Agreement, downloaded from www.pcquote.com/exchanges on Aug. 15, 1997.

TradingFloor: General Trading Information and Terms, downloaded from www.tradingfloor.com on Aug. 14, 1997.

HomeShark: Refinance Check, selected pages downloaded from www.homeshark.com on Aug. 13, 1997.

The Loan Process, downloaded form www.sdtech.com/mls/process on Aug. 7, 1997.

Trade–Direct: We Help You Trade With Confidence, selected pages downloaded from www.trade–direct.com on Aug. 6, 1997.

Classifieds2000: The Internet Classifieds, selected pages downloaded from www.classifieds2000.com on Aug. 6, 1997.

Internet Mortgage Service Eliminates Loan Agents and Passes Commissions on to the Consumer, Company Press Release, Yahoo Business Wire (Jun. 30, 1997).

Frequently Asked Questions About: Airhitch, selected pages downloaded from www.isicom.com.fr/airhitch on May 6, 1997.

Hitch a Flight to Europe, selected pages downloaded from www.travelassist.com on May 6, 1997.

Airhitch: Your Way to Low Cost Travel, selected pages downloaded from www.vaportrails.com on May 6, 1997.

Kelsey, J. and Schneier, B., Conditional Purchase Orders, $4^{th}$ ACM Conference on Computer and Communications Security, ACM Press, 117–124 (Apr. 1997).

Bryant, Adam, "Shaking Up Air Fares' Status Quo", The New York Times, Mar. 31, 1997.

Silverman, Robert, "GM Drives Wed Ad Insertion Network", Inside Media, Feb. 26, 1997, vol. 9, No. 4, p. 1;SSN:1046–5316.

"Flycast Introduces Unique 'Open Exchange' Match–Making Service", Interactive Marketing News, Feb. 21, 1997, vol. 4, No. 8.

"UK's" World Telecom Unveils New WorldSaver Tariffs, Newsbytes, Information Access Company (Feb. 13, 1997).

"TransQuest and Web Ventures Deliver Internet Booking for Delta Air Lines", PR Newswire, Dec. 10, 1996, Financial News Section.

"Affinicast Enables Web Sites That Listen and Adapt to Customer Affinities", PR Newswire, Dec. 3, 1996.

"Web Ventures Presents BookIt!" press release printed from http://www/webventures.com/bookit/(Web Ventures World Wide Web site) on Dec. 2, 1996.

"World's First Real–Time Travel Auction Service to Be Available Via World Wide Web: ETA To Open Bidding to Consumers," Business Wire, DIALOG Trade & Industry Database (Nov. 4, 1996).

Gessel, Chris, "Trade Smarter: The Limit of Orders", Investor's Business Daily, Oct. 14, 1996, p. A1.

CREST: Cruise/Ferry Revenue Management System, selected pages downloaded from www.rtscorp.com on Aug. 5, 1996.

Nishimoto, Lisa, "Travel Services Are First Online Commerce Offerings to Fly," Infoworld, Jul. 29, 1996, downloaded from http://www.infoworld.com.

About Rate Hunter, dowloaded from http://207.49.64.77/rhprodrh.htm on Jul. 14, 1996.

Cathay Pacific Online Ticket Bidding, World Internet News Digest (May 8, 1996).

Sothbey's General Information, downloaded from www.sothebys.com (1996).

CyberBid, Net Fun Ltd.(1996).

Nimmer, Raymond, T., "Electronic Contracting; Legal Issues", 14 J. Marshall J.Computer & Info L.211, Winter, 1996.

American Law Institute, Draft–Uniform Commercial Code Revised Article 2 (Sales), parts 2, 3, and 7, pp. 1–15, Jan. 4, 1996.

Speidel, Richard E. & Schott, Lee A., "Impact of Electronic Contracting on Contract Formation Under Revised UCC Article 2, Sales",C878 ALI–ABA 335, Dec. 9, 1993.

Hainer, Cathy and Grossman,Cathy Lynn,"Where Vacationing Kids Get Good Care", USA Today, Apr. 1, 1992, at p. 4D.

Del Russo, Laura, "Ticket–Bidding Firm Closes Its Door," Travel Weekly, Mar. 12, 1992.

"Newsletters", The Atlanta Constitution, Mar. 1 1992, p. K13.

"CRTL's Blue Ribbon Deals for 1992", Consumer Reports Travel Letter, Jan. 1992, vol. 8, No. 1, at pp. 3–5.

Traveler's Notes: Bookit Report, Consumer Reports Travel Letter, Dec. 1991 at p. 143.

Feldman, Joan M., "To Rein In Those CRSs; Computer Reservation Systems", Air Transport World, Dec. 1991, at p. 89.

"Money Briefs; Buy Low, Fly High", Gannet News Service, Nov. 20, 1991.

"Buy Low, Fly High", USA Today, Nov. 14, 1991 at p. 15.

Traveler's Notes; Easier Airfare Bidding, Consumer Reports Travel Letter, Oct. 1991 at p. 119.

Nelson, Janet "Practical Traveler; Airlines Relaxing Policy on No–Refund Tickets", The New York Times, Sep. 22, 1991, at p. 3 of Section 5.

Pelline, Jeff, "New Service; Now You Can Make a Bid on Your Next Airline Ticket Home", The Orange County Register, Sep. 1, 1991 at p. E01.

"Bookit Airfare Bidding System (Fax for Your Plane Ticket!)", Consumer Reports Travel Letter, Sep. 1991, pp. 97–106.

Upton, Kim "French Say Monoliths Off–limits to Visitors", Los Angeles Times, Aug. 25, 1991.

Pelline, Jeff, "Travelers Bidding on Airline Tickets; SF Firm Offers Chance for Cut–Rate Fares", San Francisco Chronicle, Section A4, Aug. 19, 1991.

Carey, Christopher, "Firm Offers Auction For Airline Tickets", St. Louis Post–Dispatch, Aug. 7, 1991 at p. 1B.

Del Rosso, Laura, "Marketel Says It Plans to Launch Air Fare 'Auction' in June", Travel Weekly , Apr. 29, 1991, NASDAQ Adds Enhancements to SOES Limit Order File, Securities Week, Nov. 26, 1990, p. 5.

Ritter, Jeffrey B., "Scope of the Uniform Commercial Code: Computer Contracting Cases and Electrical Commercial Practices", 45 Bus. Law 2533, Aug., 1990.

Greenburg, Peter, S., "Judging DeRegulation", The Record, Jul. 22, 1990 at p. T01.

Greenburg, Peter, S., "The Savvy Traveler: Lower Air Fares for Consumers Not in the Cards; Airlines: Remember When It Cost $16 to fly From Los Angeles to San Francisco? Then You Remember the Days Before DeRegulation. Since Then, Prices Have Soared", Los Angeles Times, Jul. 8, 1990 at p. L2.

Wallace, David, "Company Planning to Let Fliers Bid on Airfares", Philadelphia Business Journal, Mar. 26,1990 at p. 15.

"Letter to Business Extra", The San Francisco Chronicle Dec. 26, 1989 at p. C7.

Schrage, Michael, "An Experiment in Economic Theory; Labs Testing Real Markets", The Record Section B1, Nov. 26, 1989.

Schrage, Michael Innovation/Michael Schrage: Laboratory Experiments with Market Economics, Los Angeles Times, Nov. 23, 1989, at p. D1.

Golden, Fran "AAL's Riga Doubts Marketel's Appeal to Retailers", Travel Weekly, Nov, 13, 1989.

Del Rosso, Laura, Firm Proposes ticket–bidding system; Marketel explores electronic auction of travel; Marketel International., Travel Weekly, Section No. 91, vol. 48, p. 1; Nov. 13, 1989.

Carlsen, Clifford, "Polaris Group Set to Fly the Leveraged Sky", San Francisco Business Times, Nov. 6, 1989 at p. 1.

Kuttner, Robert, "Computers May Turn the World into One Big Commodities Pit", Business Week, Sep. 11, 1989.

Carlsen, Clifford, "From Airline Tickets to Human Organs, the Electronic Markets Are Booming", San Francisco Business Times, Aug. 14, 1989 at p. 17.

"Public May Submit Bids To Get Bargain Rates", Wall Street Journal, Section 2; p. 1, col. 1; Aug. 1, 1989.

American Airlines Internet Silent Auction, selected pages downloaded from www.americanair.com.

Apollo Host Computer, selected pages downloaded from www.appollo.com.

"Auctioning unsold airline tickets." (http://www.newciv.org/GIB/BOV/BV–409.HTMI), at p. 1.

Cathay Pacific:CyberTraveler Auction #3—Official Rules, selected pages downloaded from www.cathaypacific.com.

CSM Online: About Collector's Super Mall downloaded from www.csmonline.com.

Sabre Decision Technologies, selected pages downloaded from www.sabre.com.

PhoneMiser: Frequently Asked Questions, downloaded from www.phonemiser.com.

The United Computer Exchange: How It All Works, selected pages downloaded from www.uce.com.

Tired of Shopping For the Best Home Loan?, Mortgage Loan Specialists.

Hensley, H.G., "I'll Take Jarez," *Travel Weekly,* vol. 45, p. 7, Feb. 1986.

Gibson, R., et al., "Marketing:Fast–Food Chains Hope Diners Swallow New 'Value' Menu of Higher–Priced Items," *The Wall Street Journal,* Mar. 13, 1992, p. B1.

Anonymous, "Another Reason to Love Those Afluent Customers," *Jewelers' Circular–Keystone,* vol. CLXX, No. 7, p. 64, Jul. 1999.

LANDCORP Mortgage Services, http://www.lancorp–mortgage.com/retailpa.htm, 1998.

Inland Mortgage Corporation, http://inlandmortgage.com/index.htm, 1998.

The Mortgage Store, http://www.mortgagestore.com, 1998.

Golden Age Antiques and Collectibles Online Auction, hppt://www/goldage.com, 1997.

Moran, Susan, "Xerox Won't Duplicate Past Errors", Business Week, Sep. 29, 1997.

Coleman, Zach, "Electronics Trading System Matches Buyers, Seller", Atlanta Business Chronicle, vol. 20; No. 12, p. 37A, Aug. 22, 1997.

"What's Holding Up E–Cash?", Cybernautics Digest, vol. 3; No. 7, Finance.

Resnick, Paul et al, "Roles For Electronic Brokers", http://ccs.mit.edu/CCSWP179.htm 1997.

Philatelists Online Information, http://www506.bonsai.com/q/@1313541hyljf/infop.html, 1997.

Sports trade Information, http://www.sportstrade.com/infos.html, 1997.

Numismatists Online Information, http://www.numismatists.com/info.html, 1997.

Sell and Trade Internet Marketplace, Sell and Trade, http://sellandtrade.com/script/main.asp, 1997.

Kay, Alan, "Chapter 7 Future Research", 1997.

Trade–direct, http://www.trade–direct.com, 1997.

"Internet Mortgage Service Eliminates Loan Agents and Passes Commissions on to the Consumer", Yahoo! Finance, 1997.

Negroponte, Nicholas, "Pay Whom Per What When, Part 2", NEGROPONTE, Issue 5.03, 1997.

"Ticketing Revolution Could Triple Airline Profits, Analyst Says", Aviation Daily, vol. 325, No. 11; p. 87, 1996.

"Auctioning Unsold Airline Tickets", adapted extract from Insight (USA), The Global Ideas Bank, 1996.

Rockoff, Todd E., et al., "Design of an Internet–based system for remote Dutch auctions," Internet Research: Electronic Networking Applications and Policy, vol. 5, No. 4, pp. 10–16, 1995.

Franklin, Matthew K. et al., "The Design and Implementation of a Secure Auction Service," Proceedings: 1995 IEEE Symposium on Security and Privacy, pp. 2–14, 1995.

Tenenbaum, Jay M., et al., "CommerceNet: Spontaneous Electronic Commerce on the Internet," 1995 IEEE Spring Conference, pp. 38–43.

Sirbu, Marvin and Tygar, J.D., "NetBill: An Internet Commerce System Optimized for Network Delivered Services," IEEE 1995 Spring Conference, pp. 20–25.

Bunker, Ted, "How Auction Technology Sped And Enhanced Sale Of Radio Licenses," Investor's Business Daily, Executive Update, Regulation, p. A3, Feb. 24, 1995.

"AUCNET: The Story Continues", Harvard Business School, Jan. 17, 1995.

Anand, R., and Rao, M. Padmaja, "The Electronic Flea Market", IBM Research Division: Research Report, pp. 1–18, Jul. 28, 1994.

"Unusual Farmland Auction Set," Harrison Scott Publications, Liquidation Alert, Mar. 28, 1994.

"The Computer Museum brings auction block to cyberspace in First Internet Auction," Business Wire, Mar, 14, 1994.

Freeman, Brian and Gideon, Lidor, "Hosting Services—Linking the Information Warehouse To the Information Consumer," IEEE 1994 Spring Conference, pp. 165–171.

Booker, Ellis, "Mega real estate auction counts on imaging," Computerworld, p. 20, Dec. 7, 1992.

Abstract: "A forward/reverse auction algorithm for asymmetric assignment problems," Computational Optimization and Applications, Dec. 1992.

Abstract: "Marketel Shuts Doors," Travel Agent Magazine, Mar. 23, 1992.

Cass, Maxine, "West Coast Agents Remain Skeptical About New Air Ticket Sales Plan; Marketel: Airline ticket sales system sparks concern," Travel Agent Magazine, p. 50, Sep. 2, 1991.

Bookit!, "Airline Ticket Purchase Order For Business & Leisure Travel", Marketel International, Inc., 1991.

Inhaber, Herbert, "How To Solve the Problem of Siting Nuclear Waste," Transactions of the American Nuclear Society, vol. 62, Nov. 11–15, 1990.

Dyson, Esther, "Information, Bid and Asked," Forbes, Aug. 20, 1990.

"Mercado electronico, El change de regatear por computador", CIENCIA Technologia E Informatica, Mar. 21, 1990 (Translation enclosed).

Cole, Jeff, "Fare bidding plan could be the ticket", St. Paul Pioneer Press Dispatch, Mar. 11, 1990.

Miller, Ross M., "The Design of Decentralized Auction Mechanisms that Coordinate Continuous Trade in Synthetic Securities," Journal of Economic Dynamics and Control, pp. 237–253, 1990.

"Business Briefing, Airline Seats May Go on the Auction Block", Insight on the news, Dec. 4, 1989.

"Business Travel Update, Automation", Travel Weekly, Nov. 27, 1989.

Munro, Don and McCann, David, "A New Way to Purchase Travel, Automated Service Would Let Companies Bid For Already–Filled Airline Seats", Business Travel News, Nov. 6, 1989.

"An Electronic Auction Ahead For Airline CRS's?", The Business Week Newsletter for Information Executives, Oct. 27, 1989.

Cohen, Danny, "Electronic Commerce," ISI Research Report, University of Southern California, Oct. 1989.

"From Airline Tickets to Human organs, the Electronic Markets are Booming", Times, vol. 3, No. 50, Aug. 14, 1989.

Coyne, Andrew, "Unbundling ideas may alter world of politics," The Financial Post (Toronto), Section 1, p. 11, Sep. 27, 1989.

Malone, Thomas W., et al., "Electronic Markets and Electronic Hierarchies," Communications of the ACM, vol. 30, No. 6, Jun. 1987.

"AUCNET: TV Auction Network System," Harvard Business School, Jul. 19, 1989.

Sammer, Harald W., "Online Stock Trading Systems: Study of an Application," IEEE 1987 Spring Conference, pp 161–162.

Littlefair, T., "Homelink: a unique service," Computer Bulletin, pp. 12–14, Jun. 1986.

Banatre, Jean–Pierre, et al., "The Design and Building of Echere, a Distributed Electronic Marketing System," Communications of ACM, vol. 29, No. 1, Jan. 1986.

Turoff, Murray and Chinai, Sanjit, "An Electronic Information Marketplace," Elsevier Science Publishers B.V., pp. 79–90, 1985.

Banatre, Michel, "Distributed auction bidding system," IPC Business Press, Computer Communications, vol. 4, No. 4, Aug. 1981.

Koepper, Ken, "Room Inventory Auctioning: The Next CRS Generation", Lodging, Jan. 1990 at p.26, 29–30.

* cited by examiner

| OFFER IDENTIFIER 74 | NAME 76 | ADDRESS 78 | TELEPHONE 80 |
|---|---|---|---|
| 1123 | SUSAN JONES | 100 MAIN ST. SMALLVILLE, USA | (111)555-1234 |
| 3278 | BILL SMITH | 200 BROAD ST. SMALLVILLE, USA | (111)555-5678 |

FIG. 3

| LENDER ID 94 | LENDER NAME 96 | ADDRESS 98 | TELEPHONE 100 |
|---|---|---|---|
| 023 | CITIBANK | 123 GREEN ST. ANYTOWN, USA | (111)555-4646 |
| 342 | CHASE | 456 BLUE ST. ANYTOWN, USA | (222)555-8989 |

FIG. 4

| OFFER IDENTIFIER 116 | DATE 118 | TIME 120 | LOAN AMOUNT 122 | MONTHLY PAYMENT 124 | LOAN TERM (YEARS) 126 |
|---|---|---|---|---|---|
| 1123 | 2/2/99 | 10:15 | $100,000 | $1,000 | >10 |
| 3278 | 3/1/99 | 22:30 | $70,000 | $350 | NA |
| 9291 | 6/2/99 | 17:45 | $10,000 | $200 | NA |

110 → 1123
112 → 3278
114 → 9291

38

| LOAN INTEREST RATE 128 | EXPIRATION DATE 130 | EXPIRATION TIME 132 | LOAN TYPE 134 |
|---|---|---|---|
| LOWEST | 2/9/99 | 10:15 | SECURED |
| LOWEST | 3/10/99 | 22:30 | EQUITY |
| 8.5% | 6/6/99 | 17:45 | UNSECURED |

FIG. 5

| OFFER IDENTIFIER 148 | CREDIT REPORT IDENTIFIER 150 | CREDIT SCORE 152 |
|---|---|---|
| 1123 | 332 | 92 |
| 3278 | 672 | 78 |
| 9291 | 999 | 48 |

FIG. 6

| OFFER IDENTIFIER 168 | COLLATERAL TYPE 170 | COLLATERAL DESCRIPTION 172 | COLLATERAL VALUE 174 |
|---|---|---|---|
| 1123 | FIXED DEPOSIT | $75,000 | $75,000 |
| 3278 | HOME | EQUITY | $80,000 |
| 9291 | NA | NA | NA |
| 9333 | AUTO | EQUITY | $2,000 |

FIG. 7

| OFFER IDENTIFIER 184 | RESPONSE ID 186 | LENDER IDENTITY 188 | LOAN AMOUNT 190 | MONTHLY PAYMENT 192 | LOAN TERM (YEARS) 194 | LOAN INTEREST RATE 196 | RESPONSE DATE 198 | RESPONSE TIME 200 |
|---|---|---|---|---|---|---|---|---|
| 1123 | 3333 | CITIBANK | $100,000 | $1,000 | 15 | $I_1$ | 2/8/99 | 1:00 |
| 3278 | 4444 | CHASE | $70,000 | $350 | 30 | $I_2$ | 3/2/99 | 21:00 |

FIG. 8A

| RULE IDENTIFIER 216 | LENDER IDENTITY 218 | RULE RESTRICTION(S) 220 |
| --- | --- | --- |
| 12345 | CHASE | LOAN AMOUNT <$100,000 AND INTEREST RATE >9.25% AND CREDIT SCORE >85 |
| 67890 | CITIBANK | LOAN AMOUNT <$81,000 AND INTEREST RATE >9.9% AND CREDIT SCORE >80 |

FIG. 8B

SYSTEM AND METHOD FOR MANAGING THIRD-PARTY INPUT TO A CONDITIONAL PURCHASE OFFER (CPO)

CROSS-REFERENCE TO RELATED APPLICATIONS

The present application is a continuation-in-part of U.S. patent application Ser. No. 08/889,319, entitled CONDITIONAL PURCHASE OFFER MANAGEMENT SYSTEM, filed on Jul. 8, 1997, now U.S. Pat. No. 6,085,169 which is a continuation-in-part of U.S. patent application Ser. No. 08/707,660, entitled METHOD AND APPARATUS FOR A CRYPTOGRAPHICALLY ASSISTED COMMERCIAL NETWORK SYSTEM DESIGNED TO FACILITATE BUYER-DRIVEN CONDITIONAL PURCHASE OFFERS, filed on Sep. 4, 1996, now U.S. Pat. No. 5,794,207.

The present invention is related to the following United States Patent Applications filed contemporaneously herewith: "Conditional Purchase Offer Management System for Packages," U.S. patent application Ser. No. 08/923,683 "Conditional Purchase Offer Management System for Telephone Calls," U.S. patent application Ser. No. 08/923,317 now U.S. Pat. No. 6,345,090; "Conditional Purchase Offer Management System for Cruises," U.S. patent application Ser. No. 08/923,618 now U.S. Pat. No. 6,134,534; and "Conditional Purchase Offer Management System for Event Tickets," U.S. patent application Ser. No. 08/923,530 now U.S. Pat. No. 6,240,396, each assigned to the assignee of the present invention and incorporated by reference herein.

FIELD OF THE INVENTION

The present invention relates to methods and apparatus for processing the sale of products and, more particularly, to methods and apparatus for processing the sale of products to buyers who have submitted offers to purchase the products.

BACKGROUND OF THE INVENTION

Most systems for processing the sale of products are seller-driven. In such systems, the seller, not the buyer, sets product prices and configures products. In addition, the seller must attempt to attract buyers and complete the sales of products. Accordingly, the seller bears costs such as product advertising. Stores, catalogs, classified advertisements, telemarketing, auction houses and on-line computerized reservation systems are all seller-driven systems.

In typical seller-driven systems, a seller sets a product price and a buyer decides whether or not to accept that price. Prices for some products, such as airline tickets, can change frequently, but even in such systems the buyer must still wait for the seller to offer a price that is acceptable to the buyer.

Auctions are seller-driven, even though prices are not directly set by the seller. In an auction, the seller attracts a number of buyers who collectively bid for and thereby determine the product price. However, the seller may subsequently reject the group-determined price, if he desires.

Other systems, such as NASDAQ or the New York Stock Exchange (NYSE), match buyers and sellers by offering an efficient, fair and orderly marketplace. Such systems typically favor neither buyers nor sellers, but simply facilitate communications that allow for the matching of offers and acceptances. An example of an automated exchange-driven commerce system for trading futures is disclosed in U.S. Pat. No. 4,903,201.

In contrast to the above systems, a buyer-driven system is one in which buyers find sellers, such as a "wanted to buy" classified advertisement. A help-wanted advertisement is another type of buyer-driven system in which an employer offers to buy a product consisting of the services of a qualified employee. The inquiry is typically advertised to a large number of potential "sellers," (people who may be qualified to accept the offer). Each of the potential sellers may respond by submitting a resume to the prospective employer.

Buyer-driven systems are in many ways preferable to other systems for processing the sale of products. For example, a buyer can exercise more control over the terms and conditions of the sale of a desired product. Additionally, when a large number of potential sellers exist, but those sellers do not or cannot advertise globally, buyers may still communicate their product preferences to the sellers. A buyer-driven system would also be advantageous for sellers by allowing sellers to sell a product at a reduced price set by and known only to the buyer, thus without destroying the seller's advertised price structure. The buyer would realize the benefits of a reduced product price, while the seller would realize the benefit of selling some, but not all, products at reduced prices, when desirable.

Unfortunately, buyer-driven systems for processing the sale of products require a buyer to directly or indirectly communicate his product preferences to each of a number of potential sellers. Known systems typically make such communication too burdensome to be effective on a large scale. For example, an individual seeking car repair services generally would not want to contact every repair shop and communicate details of his repair needs to each. The benefits to the consumer from doing so (e.g., achieving a lower price) would likely be outweighed by the amount of time and money expended in the effort. Known systems also would not typically prevent buyers from receiving an inordinate number of offers from potential sellers, many of which may be unqualified.

Similarly, known buyer-driven commerce systems impose costs on sellers as well. Sellers must incur substantial costs merely to review and understand each offer, many of which may be from buyers who have little or no intention of buying. Accordingly, buyers that actually buy must pay additional costs to subsidize those that merely provide offers, but do not actually buy. Moreover, sellers may also be reluctant to customize products and/or prices for buyers.

There have been some attempts to use the Internet in a bilateral, buyer-driven system for processing the sale of products. However, those attempts have been largely unsuccessful. Currently, there exist "bulletin board" sites on the Internet where buyers can electronically post offers at little or no cost. Unfortunately, potential sellers are deterred from using bulletin board sites because (i) there is no guarantee of the authenticity of the posted offers, (ii) the cost of negotiating with individual buyers is often too high, and (iii) it is difficult to enforce any agreement (including payment guarantees) which may be reached between the buyer and the seller.

Additionally, "bulletin boards" containing posted offers are scattered across the Internet making it difficult, if not impossible, for sellers to find relevant offers. Finally, the posted offers may have any of a large number of possible formats, conditions and terms. In sum, sellers are reluctant to accept posted offers, and thus will not spend time and money to find and process offers. In turn, the absence of a sufficient number of sellers reduces the incentive for buyers to post offers.

In addition to the above-described drawbacks of known systems, sellers often require information relevant to the offer from a third party in order to determine whether to accept a buyer's offer. For example, potential buyers of artworks require that the artworks be accompanied by a trusted third party's "seal of approval". Such a seal would typically authenticate that the artworks are genuine, and also appraise their value. Similarly, potential lenders of funds require the credit history or "credit score" of a potential borrower. Lenders would typically not accept such critical information from the potential borrower, since the borrower might try to alter the information to appear more creditworthy. The credit information must come from a trusted third party.

Accordingly, an offer to borrow funds, which would include borrower-specified conditions such as an interest rate and loan amount, would, by itself, be insufficient for the lender to determine whether to accept the offer. Potential lenders would not be able to ascertain whether the offer was acceptable in terms of credit risk and credit worthiness. Thus, buyers would not be able to usefully make such offers.

Systems for evaluating borrower credit exist. For example, U.S. Pat. No. 5,611,052 to Dykstra describes a system that accesses credit bureau information to obtain a credit score of a borrower. However, the system of the Dykstra patent does not allow a buyer to specify desired loan conditions. In addition, that system does nothing to prevent people who do not intend to buy from inundating a seller with worthless loan applications.

Thus, there exists a need for a buyer-driven system for processing the sale of products which overcomes the above-described drawbacks of prior art systems. In particular, there exists a need for a buyer-driven system which allows sellers to evaluate the acceptability of an offer from a buyer in light of information relevant to the offer from a third party.

There further exists a need for such a system that would facilitate a large-scale buyer-driven system for processing the sale of products overcoming the shortfalls of known systems.

SUMMARY OF THE INVENTION

It is an object of the present invention to allow sellers to evaluate the acceptability of an offer from a buyer in light of information relevant to the offer from a third party.

Generally, according to one aspect of the present invention, a central controller receives an offer signal including at least one condition signal. The offer signal defines a conditional purchase offer having at least one condition from a customer. The central controller also receives a payment identifier signal for specifying an account from which funds may be paid. An informational signal relevant to the offer is received from a third party. The informational signal typically includes relevant information that would not be trusted if it came from the borrower submitting the conditional purchase offer.

In one embodiment, the central controller transmits the offer signal and the informational signal to at least one seller. In response, an acceptance signal is received from at least one of the sellers. The central controller selects one acceptance signal, if more than one is received, and the corresponding lender is identified. The borrower is thereby bound to the identified lender under the terms and conditions of the offer.

In another embodiment, the central controller stores at least one rule signal from each seller. Each rule signal includes at least one seller-defined restriction that an offer must meet to be accepted. The central controller compares the offer signal and the informational signal with at least one of the rule signals, and in turn determines whether the offer signal and the informational signal satisfy each seller-defined restriction of any rule. If any rules are satisfied, one rule is selected, and the corresponding lender is identified. The borrower is thereby bound to the identified lender under the terms and conditions of the offer.

In either embodiment described above, use of the payment identifier signal is initiated if it is determined that the borrower has failed to abide by terms of the offer. Thus, there is incentive for borrowers to submit only genuine offers, and if any borrower reneges, the lender is assured to receive compensation.

BRIEF DESCRIPTION OF THE DRAWINGS

FIG. 3 is a schematic illustration of a borrower database of the central controller of FIGS. 2A and 2B.

FIG. 4 is a schematic illustration of a lender database of the central controller of FIGS. 2A and 2B.

FIG. 5 is a schematic illustration of an offer database of the central controller of FIGS. 2A and 2B.

FIG. 6 is a schematic illustration of a credit report database of the central controller of FIGS. 2A and 2B.

FIG. 7 is a schematic illustration of a collateral database of the central controller of FIGS. 2A and 2B.

FIG. 8A is a schematic illustration of a response database of the central controller of FIG. 2A.

FIG. 8B is a schematic illustration of a rule database of the central controller of FIG. 2B.

DETAILED DESCRIPTION OF THE PREFERRED EMBODIMENTS

Although the description which follows employs a finance-related embodiment for purposes of illustration, those skilled in the art will understand that the scope of the present invention is not limited thereto. Accordingly, in the description below, sellers and buyers may be referred to as lenders and borrowers, respectively.

Figure 1:
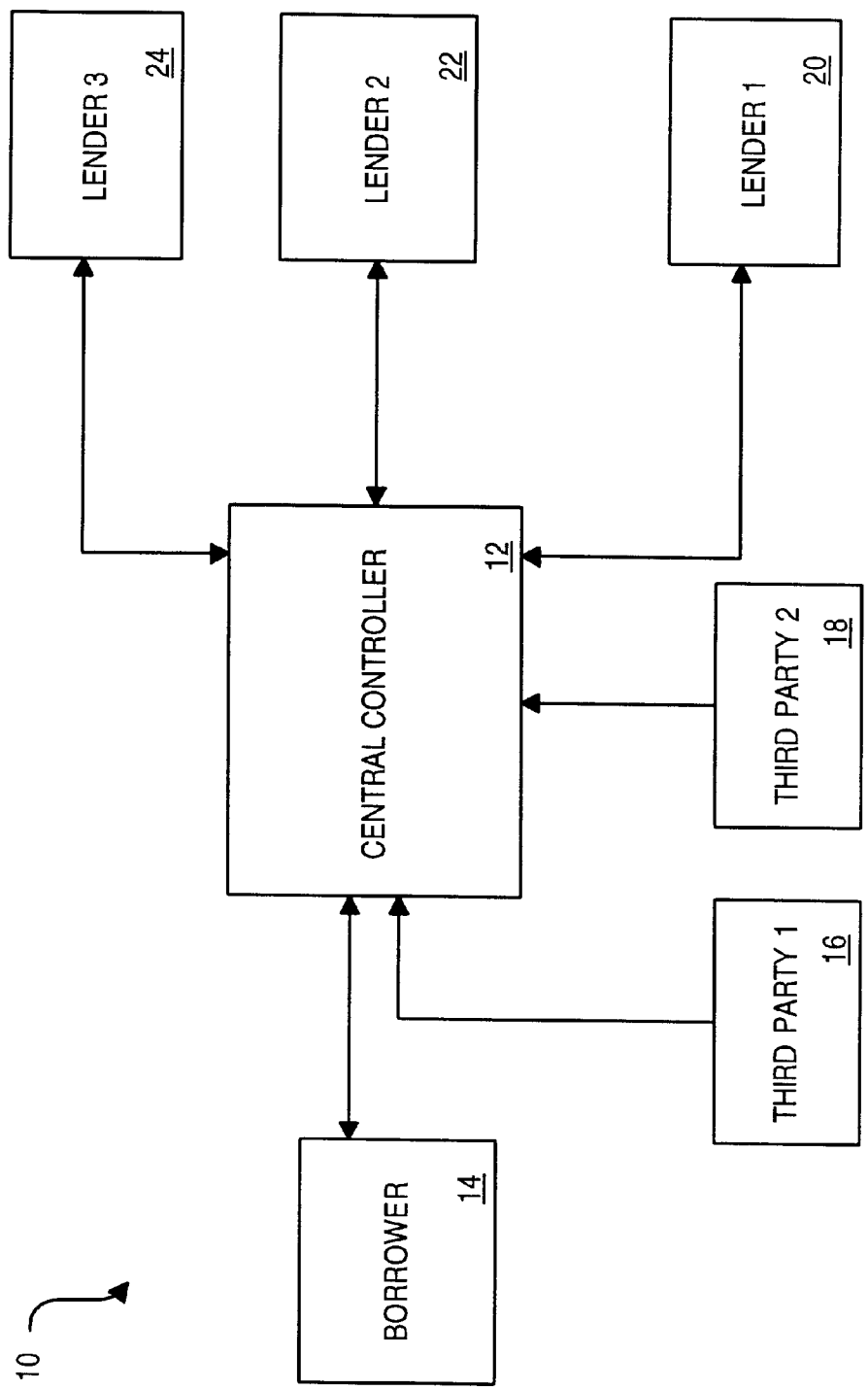
FIG. 1 is a schematic illustration of a system for processing the sale of products provided in accordance with the present invention.

Referring to FIG. 1, a system 10 for processing the sale of products comprises a central controller 12 which communicates with a borrower terminal 14, third parties 16 and 18, and lender terminals 20, 22 and 24 via the Internet or other suitable communication network. The illustrated numbers of borrower terminals, third parties and/or lender terminals are illustrative, not limiting. It will be understood by those skilled in the art that any number of borrower terminals, third parties and/or lender terminals may communicate with the central controller 12 in alternate embodiments of the present invention.

The borrower terminal 14 is typically a computer or other apparatus for generating and transmitting signals to the central controller 12. Ideally, the borrower terminal is a conventional personal computer, such as one based on an Intel 80386 microprocessor, that is connected to a modem or other remote communication device. A customer desiring to purchase a product (good or service) operates the borrower terminal 14 to transmit an offer signal including at least one condition signal to the central controller 12. The offer signal defines a conditional purchase offer having at least one condition from the customer.

In the present embodiment, the customer is a "borrower" who desires to obtain a loan (i.e., he desires to "purchase" a loan). Accordingly, the offer signal defines an offer to obtain a loan. As described in detail below, the offer may comprise any of a variety of conditions, and so the offer signal comprises one or more condition signals specifying the borrower's desired conditions. For example, the borrower may desire a particular monthly payment amount for the loan and/or a particular interest rate.

The borrower terminal 14 also transmits to the central controller 12 a payment identifier signal for specifying an general-purpose account from which funds may be paid. The payment identifier signal specifies, for example, a credit card number or checking account number of an account owned by the borrower.

The payment identifier signal is used to effectively "bind" the borrower by identifying funds to be paid if the borrower fails to carry out (consummate) his offer to purchase. The payment identifier thereby assures potential lenders that the offer is genuine and binding. For example, if the borrower reneges, the payment identifier may be used to collect an amount of funds sufficient to offset the lender's costs in processing the borrower's offer. The specific amount of funds to collect can be set either by the central controller 12, or may be left to the discretion of the lender.

In other embodiments, the payment identifier may additionally be used to collect other fees, even if the borrower consummates his offer. For example, the payment identifier may be used to collect loan transaction fees or even monthly loan payments.

If a lender operates a lender terminal to accept the offer, thereby incurring costs processing the offer, the lender is assured that he (i) may sell the loan to the borrower if he can satisfy the loan conditions; or (ii) if the borrower fails to abide by the terms of the offer (e.g., the borrower fails to consummate the loan), the lender collects a penalty payment paid from the account specified by the payment identifier signal. In both cases, the lender is assured that acceptance of the offer will yield funds, and thus acceptance of the offer is not as risky as in other systems for processing the sale of products.

As described above, sellers often require information relevant to the offer from a third party in order to determine whether to accept the offer. For example, the offer signal from the borrower would not be evaluated and accepted by a lender unless the lender knew the borrower's credit history or credit score. Accordingly, the system 10 includes third parties 16 and 18 for providing the central controller 12 with informational signals. The informational signals desirably define any information that (i) should not be viewed and/or altered by the buyer, and/or (ii) is necessary to determine the validity and/or value of the offer. The third parties 16 and 18 may be, for example, a credit-reporting bureau, which provides the central controller 12 with credit information about the borrower, and an appraiser for appraising the value of loan collateral submitted by the borrower.

The central controller 12 receives and stores the transmitted offer signal, payment identifier signal and informational signal. As described in detail below, the signals are stored in several databases, thereby facilitating the searching for and retrieval of data represented in the databases. The central controller 12 uses the stored signals to allow any of the lender terminals 20, 22 and 24 to accept the offer, if the offer is considered adequate.

If a lender terminal accepts the offer, the borrower is bound to abide by the terms of the offer. If the borrower does not, for example if the borrower does not sign the necessary loan paperwork, the central controller 12 initiates the use of the payment identifier signal to collect the funds. For example, the central controller 12 may transmit the payment identifier signal to the lender terminal, thereby allowing the lender to collect the funds. Alternatively, the central controller 12 may itself use the payment identifier signal to collect the funds.

The central controller 12 may manage the acceptance of offers in various ways. In embodiments described below, accepting an offer can include (i) transmitting the offer signal to lender terminals, and in turn receiving acceptance signals from lender terminals, or (ii) comparing the offer signal with seller's rules, and determining whether the offer satisfies any of the rules.

Figure 2A:
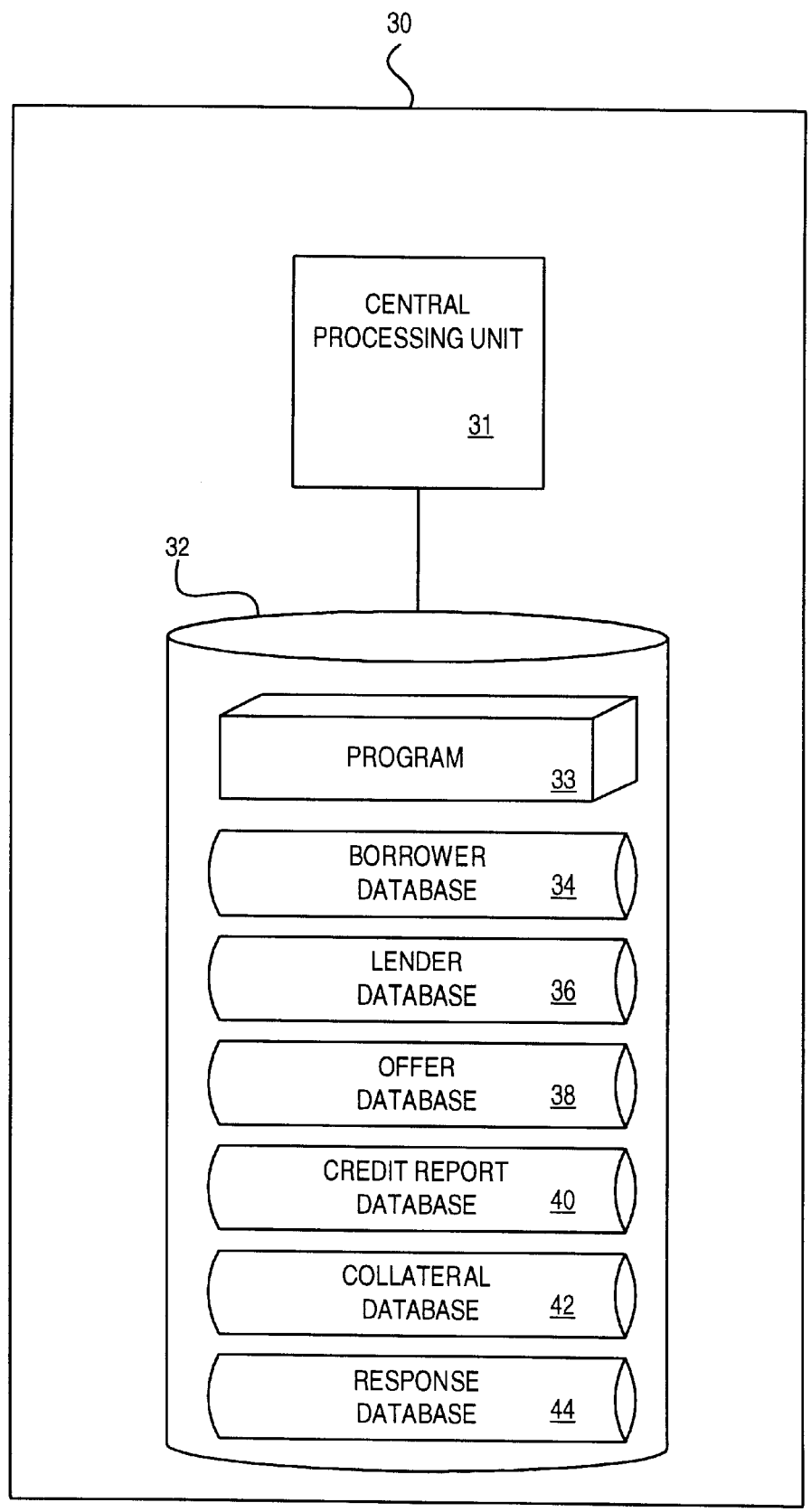
FIG. 2A is a schematic illustration of an embodiment of a central controller of the system of FIG. 1.

FIG. 2A illustrates a central controller 30, which is an embodiment of the central controller 12 (FIG. 1) that is used when accepting an offer includes the step of receiving acceptance signals from lender terminals. The central controller 30 includes a central processing unit 31, such as one or more conventional microprocessors, and a storage device 32, such as a RAM, floppy disk, hard disk or combination thereof, which is connected to the central processing unit 31. The central processing unit 31 and the storage device 32 may each be (i) located entirely within a single computer; (ii) connected thereto by a remote communication link, such as a serial port cable, telephone line or radio frequency transceiver; or (iii) a combination thereof. For example, the central controller 30 may comprise one or more computers connected to a remote server computer for maintaining databases.

The storage device 32 stores (i) a program 33 for controlling the central processing unit 31 in accordance with the present invention, and particularly in accordance with the processes described in detail hereinafter; (ii) a borrower database 34 for maintaining information on each borrower who submits an offer; (iii) a lender database 36 for maintaining information on each lender who may accept an offer; (iv) an offer database 38 for specifying each offer submitted to the central controller; (v) a credit report database 40 for storing informational signals describing credit worthiness; (vi) a collateral database 42 for storing informational signals describing collateral used in connection with the offers; and (vii) a response database 44 for specifying each acceptance received by the central controller.

The program 33 also includes necessary program elements, such as "device drivers" for interfacing with computer peripheral devices. Appropriate device drivers and other necessary program elements are known to those skilled in the art, and need not be described in detail herein. Each of the databases 34, 36, 38, 40, 42 and 44 are described in detail below.

Figure 2B:
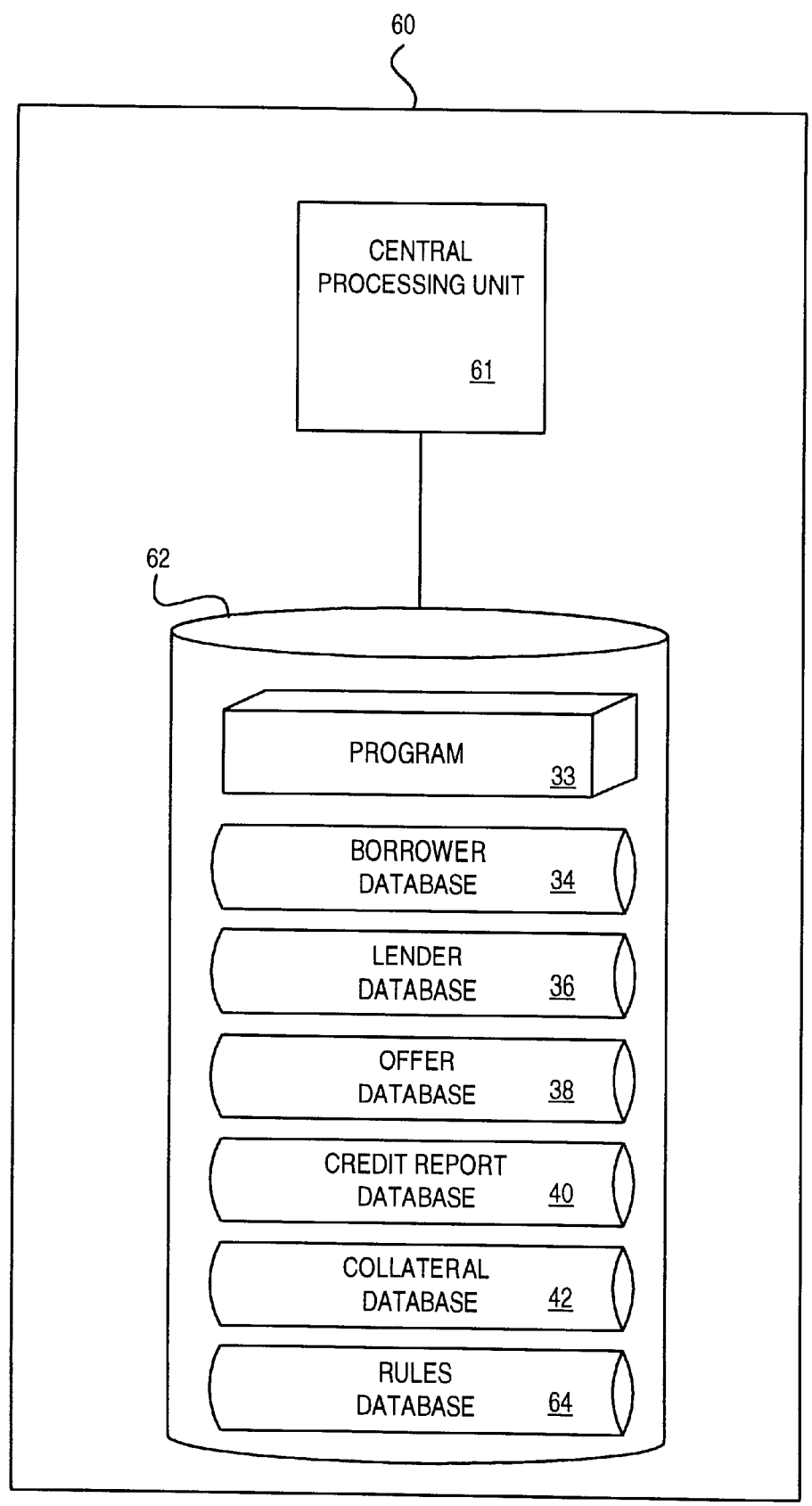
FIG. 2B is a schematic illustration of another embodiment of a central controller of the system of FIG. 1.

FIG. 2B illustrates a central controller 60, which is an embodiment of the central controller 12 (FIG. 1) that is used when accepting an offer includes the step of determining whether the offer satisfies any lender-specified rules. The central controller 60 includes a central processing unit 61 and a storage device 62 connected to the central processing unit 61. The central processing unit 61 and the storage device 62 may each be implemented in a manner similar to the central processing unit 31 and the storage device 32 of FIG. 2A.

The storage device 62 likewise stores (i) a program 33 for controlling the central processing unit 61 in accordance with the present invention; (ii) a borrower database 34 for maintaining information on each borrower who submits an offer; (iii) a lender database 36; (iv) an offer database 38; (v) a credit report database 40; and (vi) a collateral database 42; and further stores (vii) a rules database 64 for storing lender-specified rules for accepting offers. The program 33 and the databases 34, 36, 38, 40 and 42 function as described above, and the rules database 64 is described in detail below.

Referring to FIG. 3, the borrower database 34 of FIGS. 2A and 2B stores exemplary records 70 and 72, each of which corresponds to a borrower who submits an offer. Each record stores an offer identifier 74 that is generated by the central controller 12 (FIG. 1) and uniquely identifies an offer made by the borrower. Each record also stores the name 76, address 78 and telephone number 80 of the borrower.

Referring to FIG. 4, the lender database 36 of FIGS. 2A and 2B stores exemplary records 90 and 92, each of which corresponds to a lender who may accept an offer. Each record stores a lender identifier 94 that is generated by the central controller 12 (FIG. 1) and uniquely identifies a lender, as well as the name 96, address 98 and telephone number 100 of the lender.

Referring to FIG. 5, the offer database 38 of FIGS. 2A and 2B stores exemplary records 110, 112 and 114, each of which corresponds to a received offer. Each record stores an offer identifier 116 that (i) uniquely identifies an offer, and (ii) corresponds to one of the offer identifiers 74 of the borrower database 34 of FIG. 3. Each record further stores the date 118 and time 120 at which the offer was received, and conditions of the offer, such as a loan amount 122, a monthly payment 124, a loan term 126 and a loan interest rate 128. Each record may also have an expiration date 130 and expiration time 132, after which the corresponding offer may not be accepted. A loan type 134 may also be stored in embodiments where it is desirable for lenders to know, for example, whether the desired loan is secured.

Referring to FIG. 6, the credit report database 40 of FIGS. 2A and 2B stores exemplary records 142, 144 and 146, each of which corresponds to a received offer. Each record stores an offer identifier 148 that (i) uniquely identifies an offer, (ii) corresponds to one of the offer identifiers 74 of the borrower database 34 of FIG. 3, and (iii) corresponds to one of the offer identifiers 116 in the offer database 38 of FIG. 5. For each offer, there is also stored a credit report identifier 150 that is generated by the central controller 12 (FIG. 1) and uniquely identifies the results of a credit check or other evaluation of a borrower who submitted the corresponding offer. A credit score 152 defines the results of that evaluation.

Referring to FIG. 7, the collateral database 42 of FIGS. 2A and 2B stores exemplary records 160, 162, 164 and 166, each of which corresponds to a received offer. Each record stores an offer identifier 168 that uniquely identifies an offer and corresponds to the offer identifiers described above in connection with FIGS. 3, 5 and 6. For each offer, there is also stored the type 170 of collateral, a description 172 of the collateral and a value 174 of the collateral.

Referring to FIG. 8A, the response database 44 of FIG. 2A stores exemplary records 180 and 182, each of which corresponds to a received response to an offer. Each record stores an offer identifier 184 that uniquely identifies an offer and corresponds to the offer identifiers described above in connection with FIGS. 3, 5, 6 and 7. Each record also stores a response identifier 186 that uniquely identifies each received response, a lender identity 188, and conditions of the loan that the lender is willing to provide, such as a loan amount 190, a periodic payment amount 192, a loan term 194 and a loan interest rate 196. The time 198 and date 200 of the response are also stored in the response database 44.

Referring to FIG. 8B, the rule database 64 of FIG. 2B stores exemplary records 212 and 214, each of which corresponds to a rule defining criteria for when a lender will accept an offer. Each record stores a rule identifier 216 that uniquely identifies a rule, a lender identity 218 identifying the lender who accepts offers satisfying the rule and rule restrictions 220 which specify the criteria for accepting an offer.

Figure 9A:
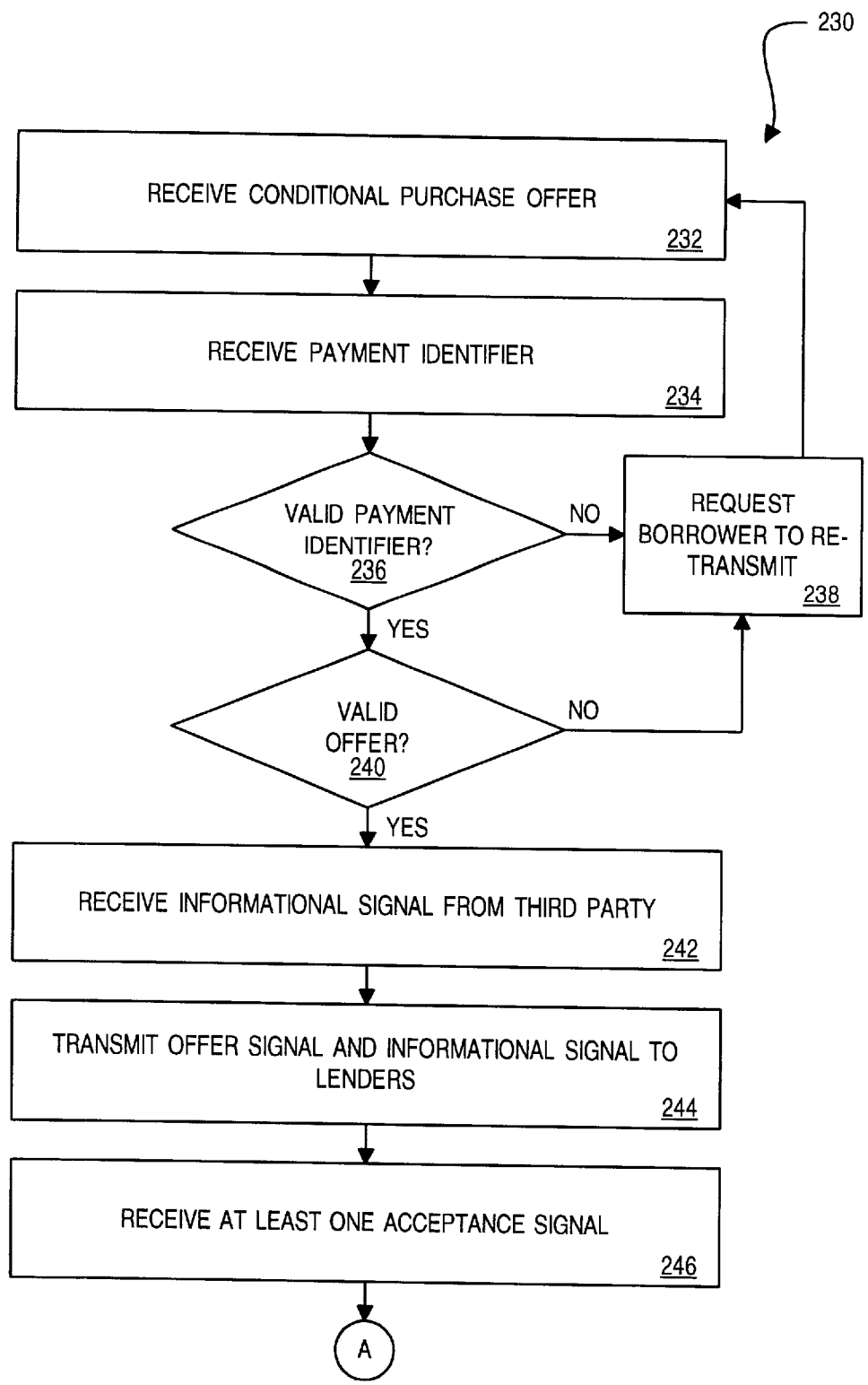
FIGS. 9A and 9B are flowcharts showing a method for processing sales of a loan between a borrower terminal and lender terminals.
Figure 9B:
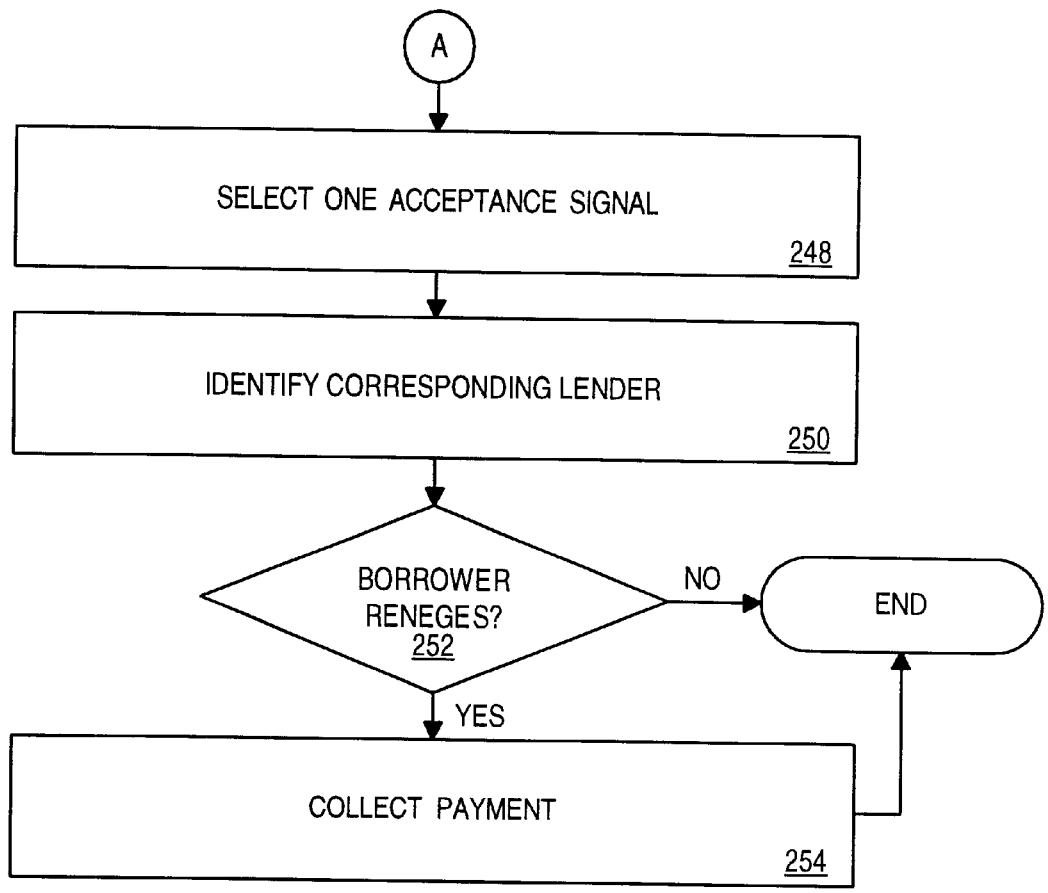

FIGS. 9A and 9B illustrate a method 230 for processing sales of a loan between a borrower terminal and one or more lender terminals. The illustrated method 230 is performed by the central controller 30 of the embodiment of FIG. 2A, in which accepting an offer includes receiving acceptance signals from lender terminals. The central controller receives from the borrower terminal an offer signal (step 232). As described above, the offer signal includes at least one condition signal, and the offer signal thereby defines an offer having at least one condition from a borrower.

A payment identifier signal is received from the borrower terminal (step 234). The payment identifier signal, such as a credit card number or checking account number, specifies an account from which funds may be paid. The payment identifier signal may additionally specify that an amount of funds are "frozen" or otherwise made unavailable to the borrower, as assurance that such funds remain available to the lender.

The central controller validates the payment identifier signal (step 236). The payment identifier signal may be validated by "freezing" an amount of funds in the account or otherwise making the funds unavailable to the borrower, and thereby assuring that such funds remain available to an accepting lender. If the payment identifier signal is not valid, the borrower terminal is requested to retransmit the offer and payment identifier signal (step 238). The central controller also validates the received offer signal (step 240), thereby determining whether the received offer signal meets predetermined validation criteria. If the offer signal does not meets the predetermined validation criteria, the borrower terminal is requested to retransmit the offer and payment identifier (step 238).

Validation typically comprises performing a financial calculation to determine whether the received offer signal defines a meaningful offer. For example, if an offer signal includes a loan amount, interest rate, loan period and monthly payment amount, a financial calculation can determine whether the specified offer is meaningful. Financial calculations of this type are well known, and described in Chapter Three of "Principles of Corporate Finance, Fourth Edition", by Richard A. Brealey and Stewart C. Myers, incorporated herein by reference as part of the present disclosure.

The central controller also requests and receives an informational signal including credit information from a third party (step 242). The informational signal may further include other information relevant to the offer, such as an appraisal value of collateral offered by the borrower. As described above, more than a single third party may supply desired informational signals to the central controller.

The central controller then transmits the offer signal and the informational signal(s) to one or more lender terminals (step 244). The central controller in turn receives, from at least one of the lender terminals, one or more acceptance signals responsive to the transmitted offer signal and informational signal (step 246). One of the acceptance signals is selected (step 248), and the corresponding lender terminal is identified (step 250). The borrower is thereby bound to the identified lender under the terms and conditions of the offer. If the borrower later reneges by not abiding by the terms of the offer (step 252), use of the payment identifier signal is initiated in order to collect the funds (step 254). For example, the central controller may collect the funds, or may transmit the payment identifier signal to the identified lender terminal, allowing the lender to directly collect the funds.

The step 248 of selecting one acceptance signal may be performed in a number of ways. For example, the first received acceptance signal or a random one of the acceptance signals may be selected. In still another embodiment, the acceptance signals may be sorted according to a predetermined sort criteria, such as sorted by lowest interest rate or lowest monthly payment amount. Selecting the first of the sorted acceptance signals would then provide the lowest interest rate or monthly payment, respectively. A number of "tie-breaking" methods may be used to select one acceptance signal from a group of equally attractive acceptance signals.

It may also be desirable to allow the borrower to select the acceptance signal, and thus choose the lender. In such an embodiment, a plurality of lender signals is transmitted to the borrower. Each lender signal indicates a lender, which in turn corresponds to one of the plurality of acceptance signals. The borrower terminal then provides the central controller with a selection signal indicative of a selected lender signal. The selection signal thereby indicates a corresponding acceptance signal, which is selected.

Selection of an acceptance signal may also occur through a condition specified by the offer. For example, an offer may comprise condition signals indicative of a loan amount, a periodic payment amount and a request for a lowest interest rate. Thus, the acceptance signal indicating the lowest interest rate received within a predetermined time is selected. Similarly, an offer may comprise condition signals indicative of a loan amount, an interest rate and a request for a lowest periodic payment amount. Such an offer may further comprise a condition signal indicative of a maximum loan period. Accordingly, the acceptance signal indicating the lowest periodic payment amount is selected.

Figure 9C:
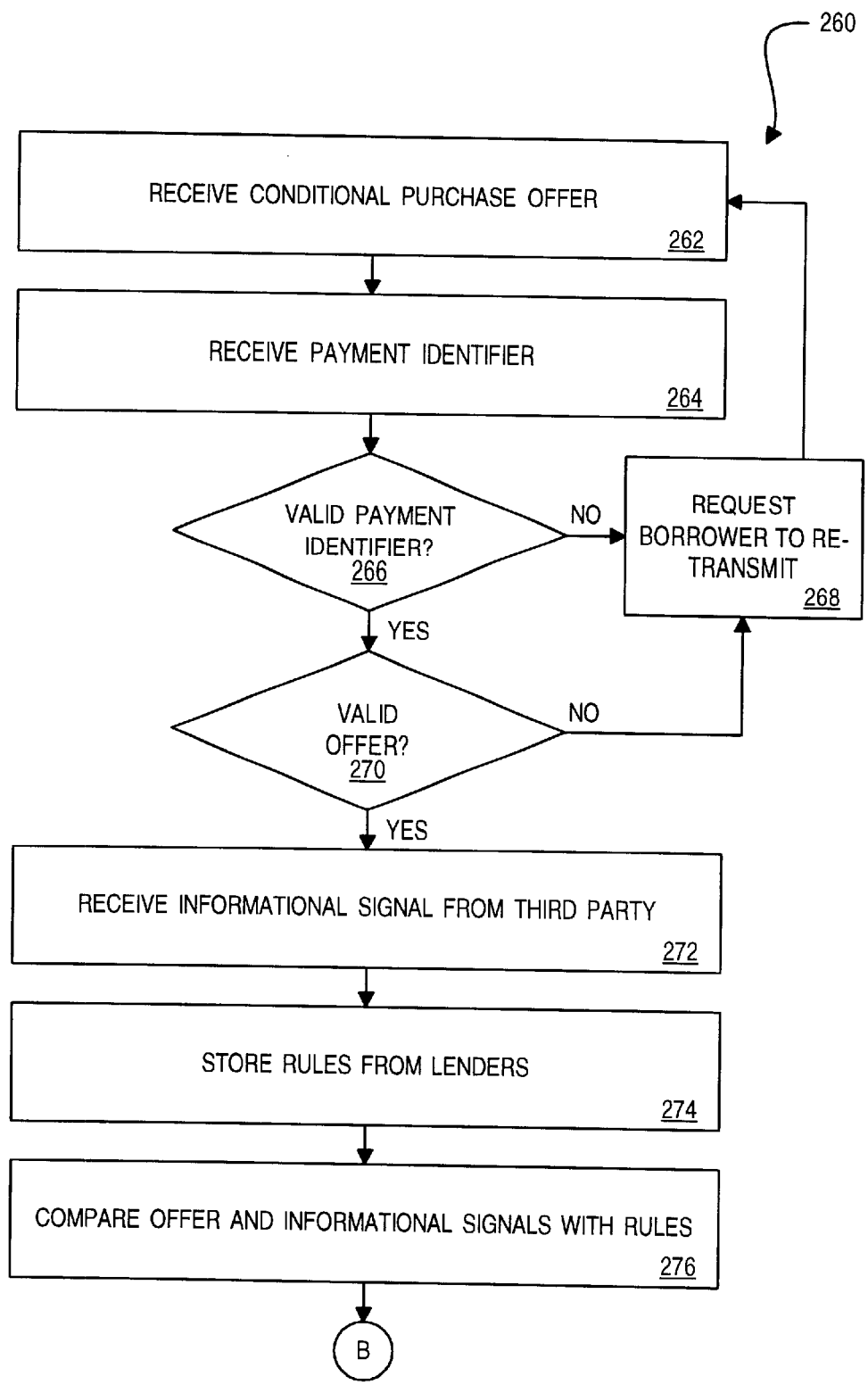
FIGS. 9C and 9D are flowcharts showing another method for processing sales of a loan between a borrower terminal and lender terminals.
Figure 9D:
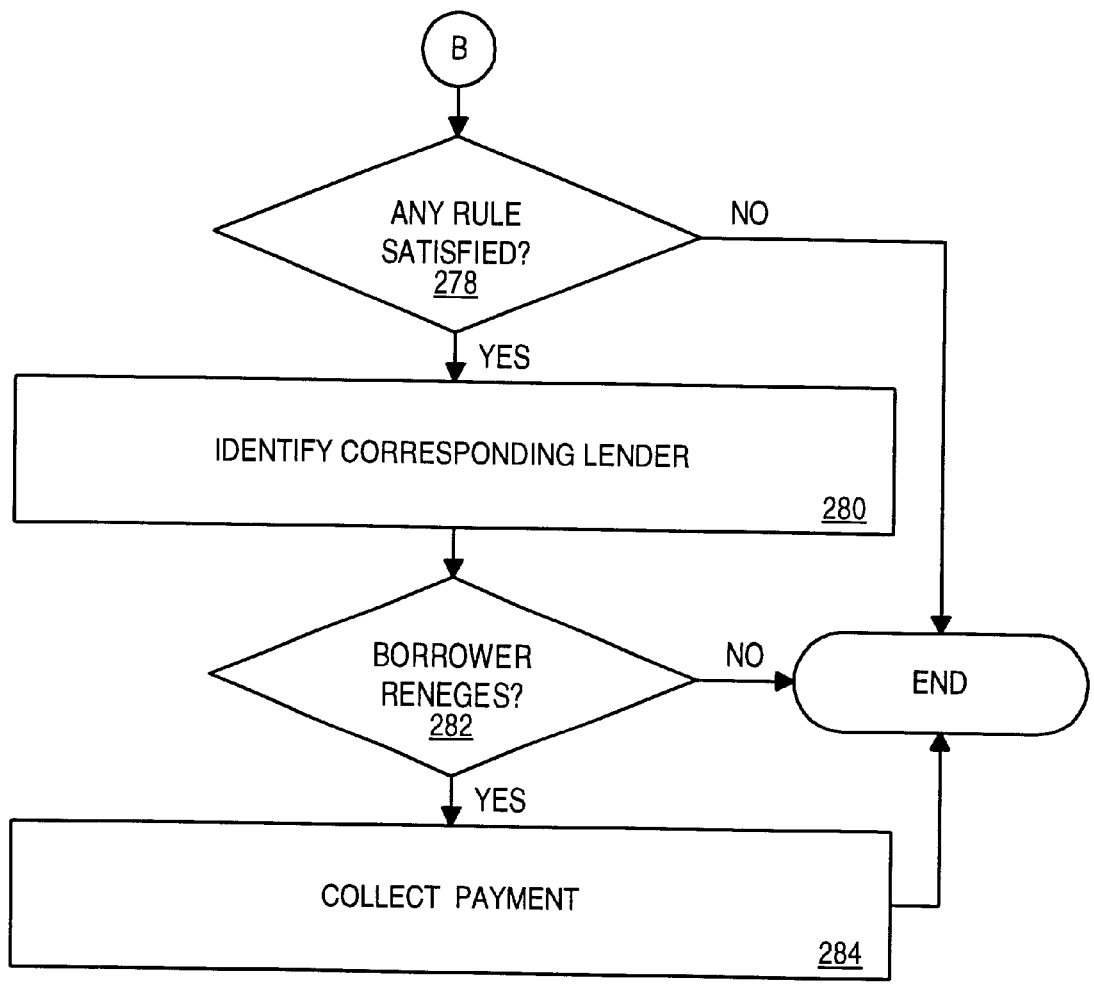

FIGS. 9C and 9D illustrate another embodiment of a method 260 for processing sales of a loan between a borrower terminal and one or more lender terminals. The illustrated method 260 is performed by the central controller 60 of the embodiment of FIG. 2B, in which accepting an offer includes comparing the offer signal with seller's rules, and determining whether the offer satisfies any of the rules.

As described above in connection with FIGS. 9A and 9B, the central controller receives from the borrower terminal an offer signal (step 262), and also receives a payment identifier signal (step 264). The central controller validates the payment identifier signal (step 266). If the payment identifier is not valid, the borrower terminal is requested to retransmit the offer and payment identifier (step 268). The central controller also validates the received offer signal (step 270), thereby determining whether the received offer signal meets predetermined validation criteria. If the offer is not meaningful, the borrower terminal is requested to retransmit the offer and payment identifier (step 268). The central controller also requests and receives an informational signal including credit information from a third party (step 272).

The central controller stores at least one rule signal from each of a plurality of sellers (step 274). Each rule signal includes at least one seller-defined restriction. Some restrictions may involve offer conditions, while other restrictions may involve the informational signal. For example, a rule may include the restrictions that the loan amount must be less than $100,000 and the credit score must be greater than eighty. It will be understood by those skilled in the art that the step 274 of storing the rule signals may occur either before or after the offer signal is received.

The offer signal and the informational signal are compared with at least one rule signal (step 276). If it is determined that the conditions of the offer and the informational signal satisfy each seller-defined restriction of any rule (step 278), the corresponding lender is identified (step 280). If more than one rule is satisfied, one rule is selected in accordance with any of the methods described above. The borrower is thereby bound to the identified lender under the terms and conditions of the offer. If the borrower later reneges by not abiding by the terms of the offer (step 282), use of the payment identifier signal is initiated in order to collect the funds (step 284), as described above.

Although the present invention has been described with respect to a preferred embodiment thereof, those skilled in the art will note that various substitutions may be made to those embodiments described herein without departing from the spirit and scope of the present invention. For example, the present invention is not limited to use with the sale of loans.

What is claimed is:

1. An apparatus for processing a loan, comprising:
   a storage device; and
   a processor disposed in communication with the storage device,
   the storage device storing:
      a program for controlling the processor; and the processor operative with the program to:
         receive an offer signal including at least one condition signal, the offer signal thereby defining a binding offer having borrower-defined loan conditions,
         receive a payment identifier signal for specifying an account from which funds may be paid as a penalty if the offer is accepted by a lender and is not processed by a borrower,
         receive an informational signal relevant to the offer from a third party, said informational signal containing credit report information regarding the borrower,
         transmit the offer signal and the informational signal to at least one lender,
         receive from at least one of the at least one lender an acceptance signal responsive to the transmitted offer signal and the transmitted informational signal, and
         selecting one acceptance signal to process the loan.

2. The apparatus of claim 1, wherein the processor is further operative with the program to:
   identify the lender from which the selected acceptance signal was received.

3. The apparatus of claim 1, wherein the processor is further operative with the program to:
   initiate the use of the payment identifier signal to collect the funds.

4. The apparatus of claim 3, wherein the processor is further operative with the program to transmit the payment identifier signal to the at least one lender.

5. The apparatus of claim 1, wherein the processor is further operative with the program to:
 validate the received offer signal, and thereby determine whether the received offer signal meets predetermined validation criteria.

6. The apparatus of claim 5, wherein the processor is further operative with the program to transmit the offer signal and the informational signal only if the validating determines that the received offer signal meets the predetermined validation criteria.

7. The apparatus of claim 1, wherein the processor is further operative with the program to select the first received acceptance signal.

8. The apparatus of claim 1, wherein the processor is further operative with the program to select a random one of the plurality of acceptance signals if a plurality of acceptance signals are received.

9. The apparatus of claim 1, wherein the processor is further operative with the program to
 if a plurality of acceptance signals are received,
  sort the plurality of acceptance signals according to a predetermined sort criteria, and
  select the first of the sorted plurality of acceptance signals.

10. The apparatus of claim 1, wherein the processor is further operative with the program to
 if a plurality of acceptance signals are received,
  transmit a plurality of lender signals, each indicative of a lender which corresponds to one of the plurality of acceptance signals,
  receive a selection signal indicative of a selected lender signal, and thereby indicate a corresponding acceptance signal, and
  select the acceptance signal corresponding to the selected lender signal.

11. An apparatus for processing a loan between a borrower terminal and at least one lender terminal, comprising:
 a storage device; and
 a processor disposed in communication with the storage device, the borrower terminal and the at least one lender terminal,
 the storage device storing a program for controlling the processor; and
 the processor operative with the program to:
  receive from the borrower terminal an offer signal including at least one condition signal, the offer signal thereby defining a binding offer having borrower-defined loan conditions,
  receive from the borrower terminal a payment identifier signal for specifying an account from which funds may be paid as a penalty if the offer is accepted by a lender and is not processed by a borrower,
  receive an informational signal including credit information from a third party, said informational signal containing credit report information regarding the borrower,
  transmit the offer signal and the informational signal to the at least one lender terminal,
  receive from the at least one lender terminal an acceptance signal responsive to the transmitted offer signal and the transmitted informational signal,
  select one acceptance signal, and
  identify the lender terminal from which the selected acceptance signal was received to process loan.

12. The apparatus of claim 11, wherein the processor is further operative with the program to:
 validate the received offer signal, and thereby determine whether the received offer signal meets predetermined validation criteria.

13. The apparatus of claim 12, wherein the processor is further operative with the program to:
 perform a financial calculation to determine whether the received offer signal defines a meaningful offer.

14. The apparatus of claim 12, wherein the processor is further operative with the program to transmit the offer signal and the informational signal only if the validating determines that the received offer signal meets the predetermined validation criteria.

15. The apparatus of claim 11, wherein the processor is further operative with the program to:
 select the first received acceptance signal.

16. The apparatus of claim 11, wherein the processor is further operative with the program to:
 select a random one of the plurality of acceptance signals if a plurality of acceptance signals are received.

17. The apparatus of claim 11, wherein the processor is further operative with the program to:
 if a plurality of acceptance signals are received,
  sort the plurality of acceptance signals according to a predetermined sort criteria, and
  select the first of the sorted plurality of acceptance signals.

18. The apparatus of claim 11, wherein the processor is further operative with the program to:
 if a plurality of acceptance signals are received,
  transmit to the borrower terminal a plurality of lender signals, each indicative of a lender which corresponds to one of the plurality of acceptance signals,
  receive from the borrower terminal a selection signal indicative of a selected lender signal, thereby indicating a corresponding acceptance signal, and
  select the acceptance signal corresponding to the selected lender signal.

19. The apparatus of claim 11, wherein the at least one condition signal indicates at least one of a loan amount, a periodic payment amount, a loan period and an interest rate.

20. The apparatus of claim 11, wherein the at least one condition signal indicates a request for a lowest of one of a periodic payment amount and an interest rate.

21. The apparatus of claim 11, wherein the offer signal includes:
 a first condition signal indicative of a loan amount,
 a second condition signal indicative of a periodic payment amount, and
 a third condition signal indicative of a request for a lowest interest rate.

22. The apparatus of claim 21, wherein the processor is further operative with the program to:
 if a plurality of acceptance signals are received, wherein each acceptance signal includes an interest rate, select an acceptance signal having the lowest interest rate of the plurality of acceptance signals.

23. The apparatus of claim 11, wherein the offer signal includes:
 a first condition signal indicative of a loan amount,
 a second condition signal indicative of a request for a lowest periodic payment amount, and
 a third condition signal indicative of an interest rate.

24. The apparatus of claim 23, wherein the processor is further operative with the program to:

if a plurality of acceptance signals are received, wherein each acceptance signal includes a periodic payment amount, select an acceptance signal having the lowest periodic payment amount of the plurality of acceptance signals.

25. The apparatus of claim 23, wherein the offer signal further includes:

a fourth condition signal indicative of a loan period.

26. The apparatus of claim 23, wherein the offer signal further includes:

a fourth condition signal indicative of a maximum loan period.

27. The apparatus of claim 11, wherein the offer signal includes:

a first condition signal indicative of a loan amount, a second condition signal indicative of a periodic payment amount, and a third condition signal indicative of an interest rate.

28. The apparatus of claim 27, wherein the second condition signal is indicative of a monthly payment amount.

29. The apparatus of claim 27, wherein the offer signal further includes:

a fourth condition signal indicative of a loan period.

30. The apparatus of claim 11, wherein the offer signal includes a first condition signal indicative of a loan amount, a second condition signal indicative of a loan period, and a third condition signal indicative of an interest rate.

31. The apparatus of claim 30, wherein the offer signal further includes:

a fourth condition signal indicative of a periodic payment amount.

32. The apparatus of claim 31, wherein the fourth condition signal is indicative of a monthly payment amount.

33. The apparatus of claim 11, wherein the processor is further operative with the program to:

initiate the use of the payment identifier signal to collect the funds.

34. The apparatus of claim 33, wherein the processor is further operative with the program to transmit the payment identifier signal to the identified lender terminal.

35. An apparatus for processing a loan, comprising:

a storage device; and a processor disposed in communication with the storage device, the storage device storing:

a program for controlling the processor; and the processor operative with the program to:

receive an offer signal including at least one condition signal, the offer signal defining a binding offer having borrower-defined loan conditions, receive a payment identifier signal for specifying an account from which funds may be paid as a penalty if the offer is accepted and is not processed by a borrower, receive an informational signal relevant to the offer from a third party, said informational signal containing credit report information regarding the borrower, store at least one rule signal from each of a plurality of lenders, each rule signal including at least one lender-defined restriction, compare the offer signal and the informational signal with the at least one rule signal; and determine whether the at least one condition and the informational signal satisfy each lender-defined restriction of any rule to process the loan.

36. The apparatus of claim 35, wherein the processor is further operative with the program to:

if each seller-defined restriction of any rule is satisfied, identify a seller which corresponds to a satisfied rule.

37. The apparatus of claim 35, wherein the processor is further operative with the program to:

if a plurality of rules are satisfied, select one of the plurality of satisfied rules.

38. The apparatus of claim 37, wherein the processor is further operative with the program to:

select a random one of the plurality of satisfied rules.

39. The apparatus of claim 37, wherein the processor is further operative with the program to:

transmit a plurality of lender-defined signals, each indicative of a lender which corresponds to one of the plurality of satisfied rules;

receive a selection signal indicative of a selected lender-defined signal, and thereby indicate a corresponding rule; and select the satisfied rule corresponding to the selected signal.

40. The apparatus of claim 37, wherein the processor is further operative with the program to:

sort the plurality of satisfied rules according to a predetermined sort criteria, and select the first of the sorted plurality of satisfied rules.

41. The apparatus of claim 37, wherein the processor is further operative with the program to:

identify a lender which corresponds to the selected rule.

42. The apparatus of claim 35, wherein the processor is further operative with the program to:

initiate the use of the payment identifier signal to collect the funds if any of the rules are satisfied.

43. The apparatus of claim 42, wherein the processor is further operative with the program to:

if each lender-defined restriction of any rule is satisfied, identify a lender which corresponds to a satisfied rule, and transmit the payment identifier signal to the identified lender.

44. The apparatus of claim 35, wherein the processor is further operative with the program to:

validate the received offer signal, and thereby determine whether the received offer signal meets predetermined validation criteria.

45. The apparatus of claim 44, wherein the processor is further operative with the program to:

perform a financial calculation to determine whether the received offer signal defines a meaningful offer.

46. The apparatus of claim 44, wherein the processor is further operative with the program to compare only if the validating determines that the received offer signal meets the predetermined validation criteria.

* * * * *